United States Patent
One

(10) Patent No.: US 7,620,829 B2
(45) Date of Patent: Nov. 17, 2009

(54) APPARATUS HAVING POWER SAVING MODE FUNCTION AND METHOD FOR CONTROLLING POWER SAVING MODE

(75) Inventor: Jae-yoon One, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 364 days.

(21) Appl. No.: 11/200,167

(22) Filed: Aug. 10, 2005

(65) Prior Publication Data

US 2006/0053318 A1 Mar. 9, 2006

(30) Foreign Application Priority Data

Sep. 6, 2004 (KR) .................. 10-2004-0070965

(51) Int. Cl.
*G06F 1/32* (2006.01)

(52) U.S. Cl. .............. 713/320; 713/300; 713/323

(58) Field of Classification Search ............ 713/320, 713/300, 323
See application file for complete search history.

(56) References Cited

U.S. PATENT DOCUMENTS

| | | | | |
|---|---|---|---|---|
| 5,457,516 A * | 10/1995 | Kim | ............... | 399/37 |
| 6,105,143 A * | 8/2000 | Kim | ............... | 713/324 |
| 6,134,401 A * | 10/2000 | Yun et al. | ............... | 399/70 |
| 6,226,472 B1 * | 5/2001 | Yun | ............... | 399/81 |
| 6,909,616 B2 * | 6/2005 | Kim | ............... | 363/16 |
| 7,209,805 B2 * | 4/2007 | Motoyama | ............... | 700/286 |
| 2002/0186395 A1 * | 12/2002 | Katsu | ............... | 358/1.13 |
| 2004/0255175 A1 * | 12/2004 | Oteki et al. | ............... | 713/300 |

FOREIGN PATENT DOCUMENTS

| | | |
|---|---|---|
| JP | 1996-0042248 | 12/1996 |
| JP | 2000-347542 | 12/2000 |
| JP | 2000353032 A * | 12/2000 |
| JP | 2002-007003 | 1/2002 |
| JP | 2002-036668 | 2/2002 |
| JP | 2003-110762 | 4/2003 |
| JP | 2003-110782 | 4/2003 |
| JP | 2003-140784 | 5/2003 |

* cited by examiner

*Primary Examiner*—Nitin C Patel
(74) *Attorney, Agent, or Firm*—Roylance, Abrams, Berdo & Goodman, LLP

(57) ABSTRACT

An apparatus having a power saving mode function and method controlling the power saving mode thereof is provided. A USB connector provides a communication interface with a USB external device by use of a USB cable. A USB controller determines whether a voltage is supplied from the USB external device based on a value of the voltage input from the USB connector. A main controller enters either the power saving mode or a standby mode based on the determination of the USB controller. Accordingly, if the computer is turned off, the apparatus enters the power saving mode before a predetermined time passes, to thus prevent the waste of power.

9 Claims, 3 Drawing Sheets

APPARATUS HAVING POWER SAVING MODE FUNCTION AND METHOD FOR CONTROLLING POWER SAVING MODE

CROSS-REFERENCE TO RELATED APPLICATION

This application claims the benefit under 35 U.S.C. §119(a) of Korean Patent Application No. 2004-70965 filed on Sep. 6, 2004 in the Korean Intellectual Property Office, the entire disclosure of which is incorporated herein by reference.

BACKGROUND OF THE INVENTION

1. Field of the Invention

The present invention relates generally to an apparatus having a power saving mode function and method for controlling the power saving mode. More particularly, the present invention relates to an apparatus having a power saving mode and method for controlling the power saving mode of an apparatus, which is capable of entering the power saving mode according to a predetermined voltage present on a universal serial bus (USB) interface.

2. Description of the Related Art

A general image forming apparatus forms an image on a recording medium such as a printing paper. Examples of the image forming apparatus include a printer, a photocopier, a facsimile machine, and a multi-function machine combining the functions of the printer, the photocopier, and the facsimile machine into one machine. The image forming apparatus, being connected to a computer, can perform various jobs such as a printing job with respect to print data transmitted from the computer, and a scanning job.

Typically, the image forming apparatus changes from a standby mode into a power saving mode when a certain printing operation is not performed during a specific time. Upon receiving a print request from a user, the standby mode supplies a certain amount of power to a device such as a fixing roller to perform the printing job. The power saving mode stops the power supply when the image forming apparatus is not used within a specific time.

However, the conventional image forming apparatus enters into the power saving mode from the standby mode when it is not used for a specific time. When the computer connected with the image forming apparatus is turned off, the image forming apparatus must still wait a predetermined amount of time before entering the power saving mode. Accordingly, the conventional image forming apparatus wastes power unnecessarily because of having to wait to enter to the power saving mode even when the computer is turned off.

SUMMARY OF THE INVENTION

The present invention has been developed in order to solve the problems discussed above and other problems associated with the conventional arrangement. An aspect of the present invention provides an apparatus having a power saving mode function and method for controlling the power saving mode of an apparatus, which is capable of entering the power saving mode without having to wait a predetermined time when a connected computer is turned off.

To achieve the above aspect of the present invention, an apparatus having a power saving mode function comprises a universal serial bus (USB) connector for providing a communication interface with a USB external device by use of a USB cable; a USB controller for determining whether a voltage is supplied from the USB external device based on a value of the voltage input from the USB connector; and a main controller for entering either the power saving mode or a standby mode based on the determination of the USB controller.

The main controller enters the power saving mode when the USB controller determines that a predetermined voltage is not supplied to the USB connector.

The main controller enters the standby mode when the USB controller determines that a predetermined voltage is supplied to the USB connector.

The main controller returns to the power saving mode from the standby mode when a request for a certain operation is not received during a predetermined time period after entering the standby mode.

The apparatus further comprises a print engine for printing data that is transmitted from the USB external device, if the USB external device is a host computer, which transmits the printing data to the USB connector through the USB cable. The main controller controls the print engine to print the received printing data.

Consistent with the above aspect of the present invention, a method for controlling a power saving mode of an apparatus having a universal serial bus (USB) connector, comprises the steps of determining whether a predetermined voltage is supplied from a USB external device to the USB connector through a USB cable; and entering either the power saving mode or a standby mode based on the determination.

The entering step enters the power saving mode when the determining step determines that the predetermined voltage is not supplied to the USB connector.

The entering step enters the standby mode when the determining step determines that the voltage is supplied to the USB connector.

The method further comprises the step of returning to the power saving mode when a certain operation is not performed in a predetermined time after entering the power saving mode.

BRIEF DESCRIPTION OF THE DRAWING FIGURES

These and or other aspects and advantages of the invention will become apparent and more readily appreciated from the following description of exemplary embodiments, taken in conjunction with the accompanying drawing figures of which:

DETAILED DESCRIPTION OF THE EMBODIMENTS

Figure 1:
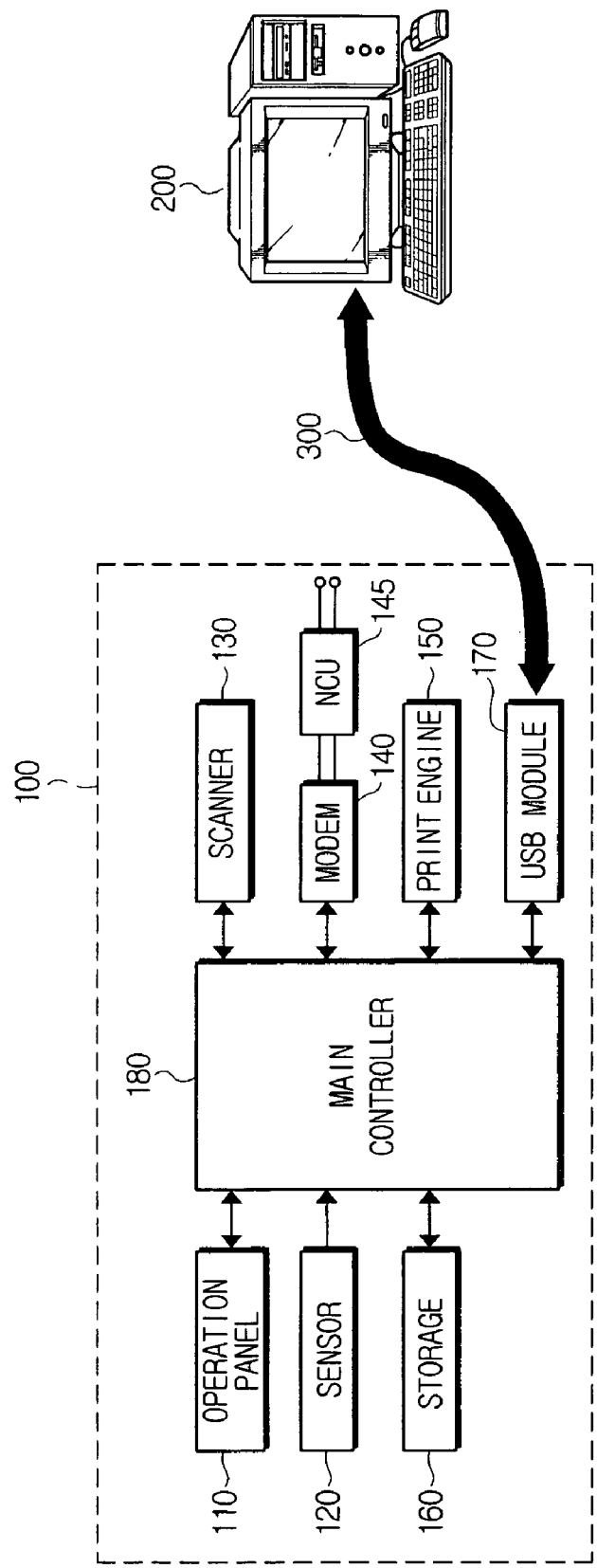
FIG. 1 illustrates an apparatus having a power saving mode function and a universal serial bus (USB) external device being connected to the apparatus according to an embodiment of the present invention.

Reference will now be made in detail to the embodiments of the present invention, examples of which are illustrated in the accompanying drawings, wherein like reference numerals refer to the like elements throughout. The embodiments are described below in order to explain the present invention by referring to the drawings.

FIG. 1 illustrates an apparatus having a power saving mode function and a universal serial bus (USB) external device being connected to the apparatus according to an embodiment of the present invention.

Referring to FIG. 1, the apparatus 100 having the power saving mode function supports a USB interface. By way of example, the apparatus 100 is an image forming apparatus.

The USB external device 200 is connected with the apparatus 100 through a USB cable 300. By way of example the USB external device is a host computer.

Provided that the USB external device 200 is a host computer, the USB external device 200 can send a request to the apparatus 100 requesting jobs to be performed relating to image formation such as a printing job, a scanning job, and a fax job. The USB external device 200 supplies voltage to the apparatus 100 through a power line of the USB cable 300 so as to drive a USB module 170.

To this end, the apparatus (hereinafter, referred to as an image forming apparatus) 100 comprises an operation panel 110, a sensor 120, a scanner 130, a modem 140, a network control unit (NCU) 145, a print engine 150, a storage 160, the USB module 170, and a main controller 180.

The operation panel 110 is provided with various function keys to select and set functions supported by the image forming apparatus 100, and a liquid crystal display (LCD) screen to display an operation state of the image forming apparatus 100.

The sensor 120 senses all operations changeable according to a user's setup, such as the opening and closing of a cover, the presence and absence of a cassette, the presence of absence of paper in the cassette, and a manual paper feeding.

When the sensor 120 detects the placement of a document, the scanner 130 scans the placed document and reads the image data.

The modem 140 modulates the data to be transmitted to an outside facsimile machine (not shown), and demodulates data received from the outside facsimile machine (not shown). The NCU 145 controls access to the outside facsimile machine (not shown) by connecting a public switched telephone network (PSTN) with the modem 140. The NCU 145 detects the sending and receiving of a dial signal of the outside facsimile machine (not shown).

The print engine 150 prints document data and scanned data prepared by the USB external device 200, and data received through the NCU 145. The print engine 150 preferably includes a fixing means which heats and presses a recording paper on which an image is formed to a predetermined temperature to fix the image on the recording paper.

The storage 160 preferably comprises a nonvolatile memory and a volatile memory. The nonvolatile memory stores control programs required for the operation of the image forming apparatus 100. The volatile memory stores the data generated during the operation of the image forming apparatus 100.

The USB module 170 supports data communications with the USB external device (hereinafter, referred to as a host computer) 200 through a USB interface. The USB module 170 and the host computer 200 are connected to each other through the USB cable 300, and send and receive power and data.

Figure 2:
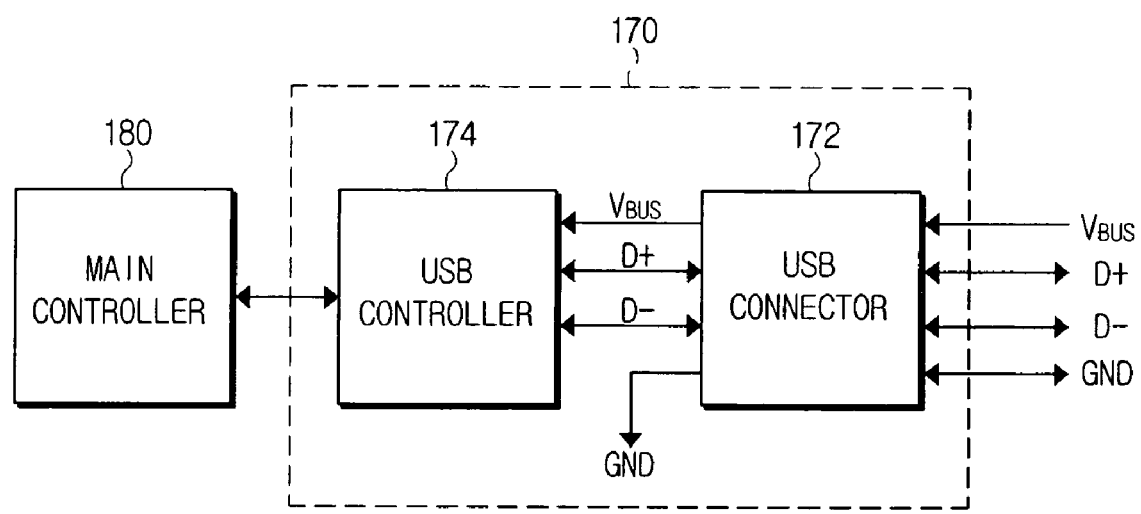
FIG. 2 illustrates the USB module of FIG. 1 in detail.

FIG. 2 illustrates the USB module 170 of FIG. 1 in more detail.

Referring now to FIGS. 1 and 2, the USB module 170 comprises a USB connector 172 and a USB controller 174.

The USB cable 300 includes two power lines $V_{BUS}$ and GND and two signal lines D+ and D−. The power line $V_{BUS}$ provides a path for the power supplied from the host computer 200 in order to drive the USB module 170. The two signal lines D+ and D− provide data paths between the image forming apparatus 100 and the host computer 200.

The USB connector 172 includes two power pins $V_{BUS}$ and GND and two signal pins D+ and D−. The power pins $V_{BUS}$ and GND are connected with the power lines $V_{BUS}$ and GND of the USB cable 300, respectively. The signal pins D+ and D− are connected with the signal lines D+ and D− of the USB cable 300, respectively.

As constructed above, the voltage supplied from the host computer 200, for example, 5V, is input to the power pin $V_{BUS}$ of the USB connector 172 via the power line $V_{BUS}$ of the USB cable 300. If the host computer 200 is turned off or the USB cable 300 is disconnected from the USB connector 172 or the host computer 200, 0V is input to the power pin $V_{BUS}$ of the USB connector 172.

The USB controller 174 determines whether the predetermined voltage is supplied from the host computer 200 based on a value of the voltage input from the power pin $V_{BUS}$ of the USB connector 172.

To be specific, if a voltage more than 0V, for example, 5V is input to the power pin $V_{BUS}$ of the USB connector 172, the USB controller 174 confirms the voltage supply from the host computer 200 and sets a registry value of $V_{BUS}$ to '1'.

If 0V is input to the power pin $V_{BUS}$ of the USB connector 172, the USB controller 174 confirms that there is no voltage supply from the host computer 200 and sets a registry value of $V_{BUS}$ to '0'.

The exemplary 5V input to the USB controller 174 indicates that the host computer 200 is turned on. The 0V input indicates turn-off of the host computer 200, and also denotes that the USB cable 300 is disconnected from the USB connector 172 or the host computer 200.

The main controller 180 controls the overall operations of the image forming apparatus 100 according to the control programs stored in the storage 160. For instance, the main controller 180 controls whether the apparatus will enter a power saving mode when the image forming apparatus 100 is not used for a predetermined time in standby mode. A predetermined time is allowed to pass before for the image forming apparatus 100 enters the power saving mode from the standby mode. The image forming apparatus 100 should not be used or perform any operation for the predetermined time.

In an embodiment of the present invention, the main controller 180 controls the image forming apparatus 100 to enter or maintain either the power saving mode or the standby mode based on the determination of the USB controller 174. In the standby mode, the image forming apparatus 100 gets ready to perform an operation such as a printing job, a fax job, a scanning job, and a photocopying job.

Specifically, if the image forming apparatus 100 is in the standby mode, the main controller 180 controls when to maintain the standby mode when it is confirmed that the registry value of $V_{BUS}$ is set to '1' by the USB controller 174.

If the image forming apparatus 100 is in the power saving mode, the main controller 180 begins processing to enter a warm-up mode from the power saving mode when it is confirmed that the registry value of $V_{BUS}$ is set to "1" by the USB controller 174.

If the image forming apparatus 100 is in the standby mode, the main controller 180 begins processing to enter the power saving mode when it is confirmed that the registry value of $V_{BUS}$ is set to "0" by the USB controller 174.

If the image forming apparatus 100 is in the power saving mode, the main controller 180 begins processing to maintain the power saving mode when it is confirmed that the registry value of $V_{BUS}$ is set to "0" by the USB controller 174.

The main controller 180 processes to return to the power saving mode when the image forming apparatus 100 does not operate for a predetermined time after the voltage is supplied to the power pin $V_{BUS}$ of the USB connector 172 and the power saving mode is released.

It is advantageous that the main controller 180 periodically connects to the USB controller 174 and determines whether the voltage is supplied from the host computer 200. The main controller 180 periodically checks the registry value of the USB controller 714 and adaptively enters either the power saving mode or the standby mode.

Figure 3:
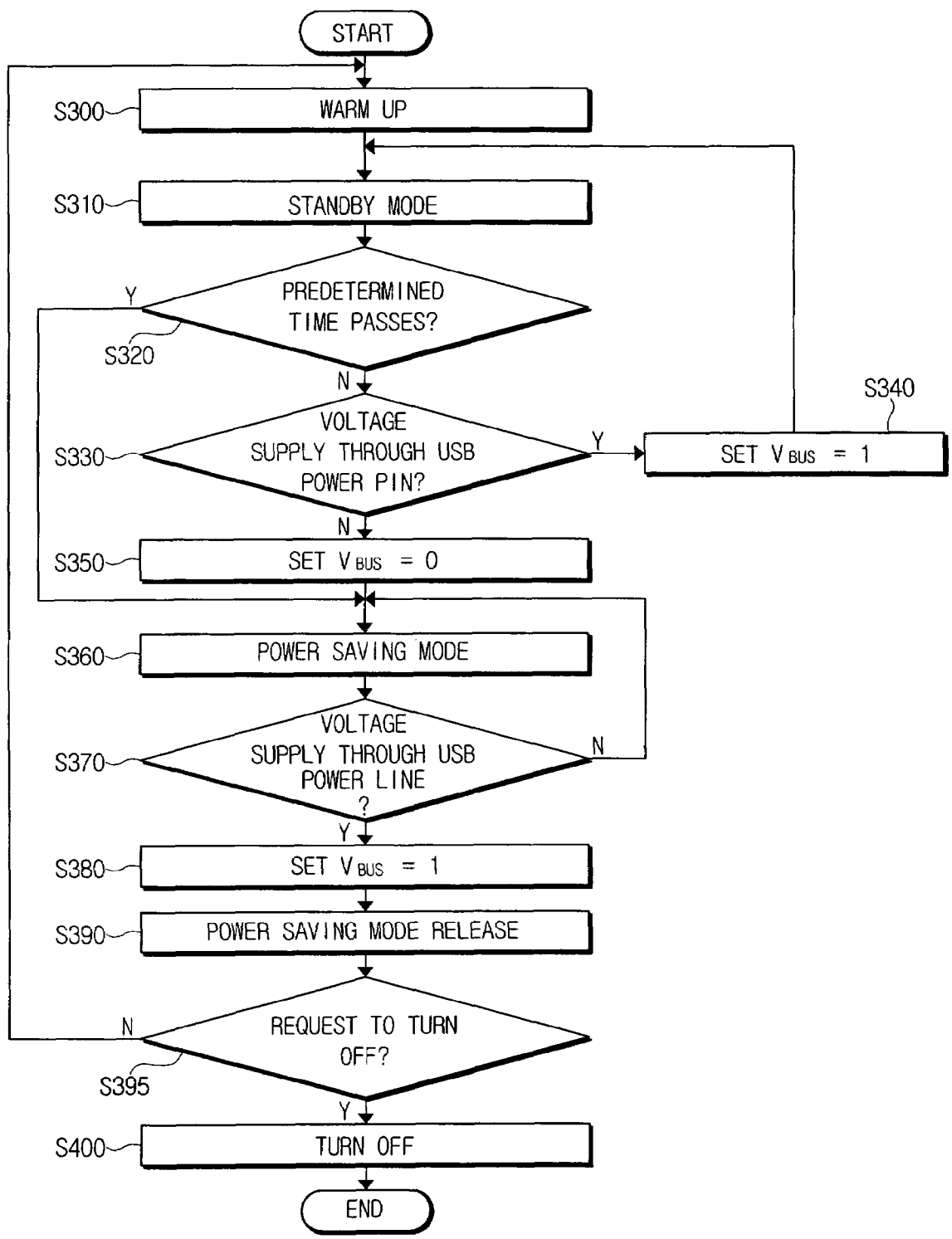
FIG. 3 illustrates a flowchart of a method controlling the power saving mode according an embodiment of the present invention.

FIG. 3 is a flowchart of a method for controlling the power saving mode of FIG. 1 according to an embodiment of the present invention.

Referring to FIGS. 1 and 3, the main controller 180 controls the print engine 150 to warm up the fixing means (not shown) to a certain temperature at step S300.

The main controller 180 enters the standby mode to maintain the temperature of the fixing means (not shown) for a predetermined time at step S310.

If the predetermined time does not elapse at step S320, the USB controller 174 determines whether the predetermined voltage is supplied through the power pin $V_{BUS}$ of the USB connector 172 at step S330.

If the determination is made that the predetermined voltage is supplied through the power point $V_{BUS}$ of the USB connector 172 at step S330, the USB controller 174 sets the registry value of $V_{BUS}$ to "1" at step S340. When the main controller 180 confirms that the registry value of $V_{BUS}$ is "1", the main controller 180 maintains the standby mode at step S310.

If it is determined that the voltage is not supplied through the power pin $V_{BUS}$ of the USB connector 172 at step S330, the USB controller 174 sets the registry value of $V_{BUS}$ to "0" at step S350.

Upon confirming that the registry value of $V_{BUS}$ of the USB controller 174 is "0", the main controller 180 enters the power saving mode at step S360. This is because the registry value "0" of $V_{BUS}$ denotes that there is no substantial voltage supplied from the host computer 200.

After confirming that the predetermined voltage supplied through the power pin $V_{BUS}$ of the USB connector 172 at step S370, the USB controller 174 sets the registry value of $V_{BUS}$ to "1" at step S380. At step S370, the predetermined voltage is supplied when the USB cable 300 is connecting the USB connector 172 and the host computer 200 for communication therebetween or when the host computer 200 is turned on.

Upon confirming the registry value "1" of $V_{BUS}$, at step S390, the main controller 180 releases the power saving mode entered at step S360.

In case that it is determined that the predetermined voltage is not supplied through the power pin $V_{BUS}$ of the USB connector 172 at step S360, the main controller 180 maintains the power saving mode.

Following step S390, when a power off command is received from the operation panel 110 at step S395, the main controller 180 turns off the image forming apparatus at step S400.

When the power off command is not received, the main controller 180 proceeds to S310 through S395. In further detail, when the power off command is not received after step S390, the main controller 180 enters the standby mode and returns to the power saving mode if the image forming apparatus 100 does not operate over a predetermined time.

When the predetermined time elapses after step S310, the main controller 180 proceeds to step S360.

According to an embodiment of the present invention, the image forming apparatus 100 determines the turn-on or the turn-off of the host computer 200 by checking out the value of $V_{BUS}$ input to the USB connector 172. The image forming apparatus 100 enters or maintains either the power saving mode or the standby mode based on the determination.

As mentioned above, the apparatus having the power saving mode function and method for controlling the power saving mode thereof can enter the power saving mode before a predetermined time passes when the computer being connected through the USB interface is turned off or the USB cable is disconnected from the USB module. Therefore, it is possible to reduce the time required to enter the power saving mode and to prevent the waste of the power.

While the exemplary embodiments of the present invention have been described, additional variations and modifications of the embodiments may occur to those skilled in the art once they learn of the basic inventive concepts. Therefore, it is intended that the appended claims shall be construed to include both the above embodiments and all such variations and modifications that fall within the spirit and scope of the invention.

What is claimed is:

1. An apparatus having a power saving mode function, comprising:
   a universal serial bus (USB) connector for providing a communication interface with a USB external device by use of a USB cable;
   a USB controller for determining whether a predetermined voltage is supplied from the USB external device based on a value of an input voltage from the USB connector;
   a print engine; and
   a main controller for entering either the power saving mode or a standby mode for the print engine based on the determination of the USB controller;
   wherein the main controller and the print engine enters the power saving mode when the USB controller determines that the predetermined voltage is not supplied to the USB connector; and
   wherein the main controller and the print engine enters the standby mode when the USB controller determines that the predetermined voltage is supplied to the USB connector.

2. The apparatus as claimed in claim 1, wherein the main controller returns to the power saving mode from the standby mode when a request for an operation is not received or performed by the print engine during a predetermined time after entering the standby mode.

3. The apparatus as claimed in claim 1,
   wherein the print engine is configured for printing data transmitted from the USB external device if the USB external device is a host computer which transmits the printing data to the USB connector through the USB cable; and
   wherein the main controller controls the print engine to print the received printing data.

4. The apparatus as claimed in claim 3, wherein:
   power is supplied during the standby mode to one or more components of the print engine,
   power is not supplied during the power saving mode to the one or more components of the print engine,
   the power supplied to the print engine in the standby mode is insufficient to initiate an immediate print job, and
   the power supplied in the power saving mode is less than that supplied during the standby mode.

5. The apparatus as claimed in claim 3, wherein the print engine comprises fixing means that heats and processes recording paper on which an image is formed to a predetermined temperature to fix the image on the recording paper.

6. A method for controlling a power saving mode of an apparatus having a universal serial bus (USB) connector, the method comprising the steps of:

determining whether a predetermined voltage is supplied from a USB external device to the USB connector through a USB cable;

providing a print engine; and entering either the power saving mode or a standby mode for the main controller and the print engine based on the determination of whether the predetermined voltage is supplied from the USB external device to the USB connector through the USB cable;

wherein in the entering step, the main controller and the print engine enters the power saving mode when the determining step determines that the predetermined voltage is not supplied to the USB connector; and wherein in the entering step, the main controller and the print engine enters the standby mode when the determining step determines that the predetermined voltage is supplied to the USB connector.

7. The method as claimed in claim 6, further comprising the step of:

returning to the power saving mode when an operation is not received or performed by the print engine during a predetermined time after entering the standby mode.

8. The method as claimed in claim 6, wherein:

the print engine is configured for printing data transmitted from the USB external device if the USB external device is a host computer which transmits the printing data to the USB connector through the USB cable; and wherein the main controller controls the print engine to print the received printing data.

9. The method as claimed in claim 6, wherein the print engine comprises fixing means that heats and processes recording paper on which an image is formed to a predetermined temperature to fix the image on the recording paper.

* * * * *

UNITED STATES PATENT AND TRADEMARK OFFICE
CERTIFICATE OF CORRECTION

PATENT NO.      : 7,620,829 B2                                              Page 1 of 1
APPLICATION NO. : 11/200167
DATED           : November 17, 2009
INVENTOR(S)     : Jae-yoon One It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 515 days.

Signed and Sealed this

Twenty-sixth Day of October, 2010

David J. Kappos
*Director of the United States Patent and Trademark Office*